United States Patent [19]
Jankus

[11] Patent Number: 5,944,247
[45] Date of Patent: Aug. 31, 1999

[54] PROTECTIVE DEVICE FOR SEAM BEING WELDED

[76] Inventor: Werner Jankus, Auf der Höhe 7, D-58313 Herdecke, Germany

[21] Appl. No.: 08/816,000

[22] Filed: Mar. 10, 1997

[30] Foreign Application Priority Data

Mar. 13, 1996 [DE] Germany .................. 196 09 759

[51] Int. Cl.⁶ ............... B23K 5/22; B23K 9/02
[52] U.S. Cl. ................................. 228/42; 228/50
[58] Field of Search .................. 228/42, 50, 216

[56] References Cited

U.S. PATENT DOCUMENTS

| | | | |
|---|---|---|---|
| 2,331,937 | 10/1943 | Schreiner | 228/50 |
| 3,372,852 | 3/1968 | Cornell | 228/42 |
| 4,285,458 | 8/1981 | Slavens | 228/50 |
| 4,465,220 | 8/1984 | Ledlow et al. | 228/50 |
| 4,682,724 | 7/1987 | Hahn | 228/20 |
| 5,110,031 | 5/1992 | Rinaldi | 228/216 |
| 5,235,152 | 8/1993 | Jankus | 219/74 |

OTHER PUBLICATIONS

"Verwendung von Kermischen Badsicherungen Beim Lichtbogen–Schweissen" Der Praktiker, Jul. 1995, F.Tessin, pp. 330–332.

Primary Examiner—Geoffrey S. Evans
Assistant Examiner—Jeffrey T. Knapp
Attorney, Agent, or Firm—Herbert Dubno; Andrew Wilford

[57] ABSTRACT

A protective device for welding a seam between a pair of workpieces has a flexible metallic band extending along the seam, spaced from surfaces of the workpieces, and having longitudinal edges on which are carried respective elastomeric heat-resistant strips extending the full length of the band and engaging the surfaces of the workpieces. A flexible ceramic band is provided between the elastomeric strips on the metal band between same and the surfaces. The band has a face turned toward and spaced from the surfaces and forms with the surfaces at the seam a chamber extending along the seam.

14 Claims, 4 Drawing Sheets

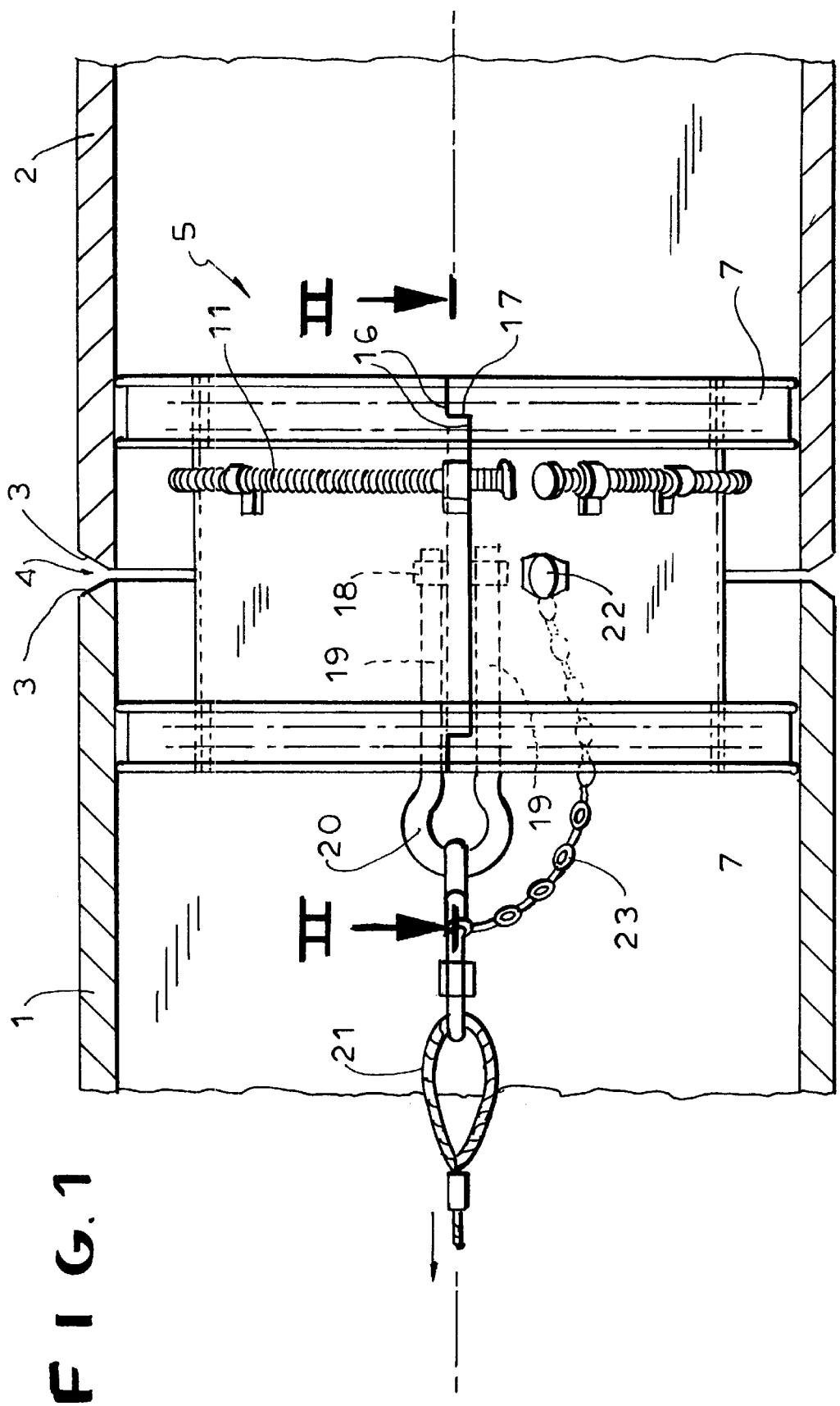

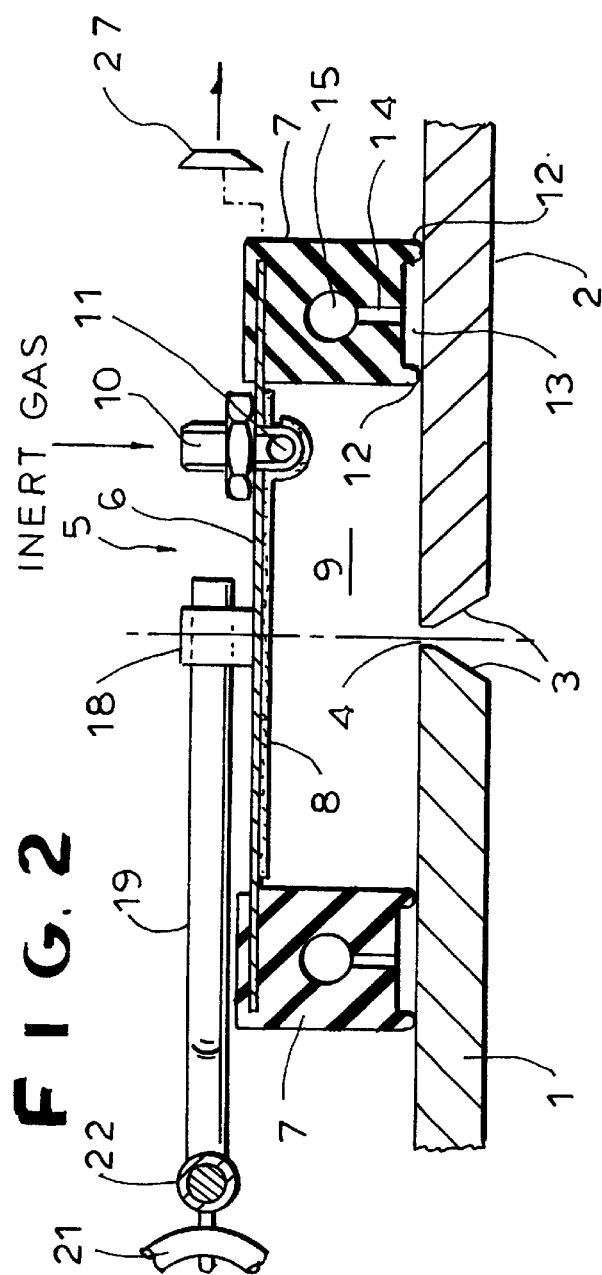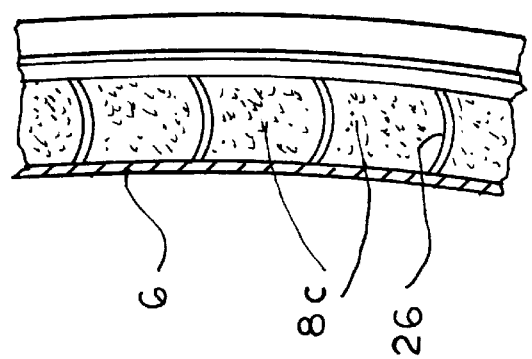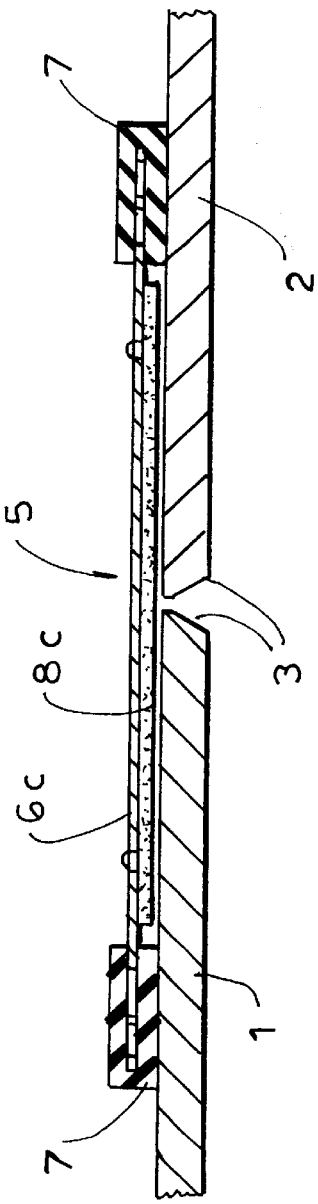

PROTECTIVE DEVICE FOR SEAM BEING WELDED

FIELD OF THE INVENTION

The present invention relates to a hindgas protective device for a seam being welded. More particularly this invention concerns such a device for butt-welding two pipes together.

BACKGROUND OF THE INVENTION

In order to form a neat and strong weld at a seam between two workpieces it is standard as described in U.S. Pat. No. 5,126,526 of Schnorrer and in my U.S. Pat. No. 5,235,152 to juxtapose with one side of the seam a so-called hindgas implement or device. This device forms a generally closed chamber that extends along the back of the seam and that is flooded with an inert gas so that the surface of the weld does not oxidize. In order to protect the appliance, it is normally made of a ceramic that can withstand the heat of the welding operation.

In a standard such device as described in "Der Praktiker" (July 1995, pages 330–332) a row of ceramic blocks form several laterally closed passages through which extend flexible metallic wires so that the device can be shaped to conform to the shape of the workpieces. Such a device is fairly difficult to fit accurately to the workpieces, especially when the seam is curved, and is also very hard to hold securely in place during the welding operation. Normally suction or magnetic clips are used to hold the device in place, making its installation fairly difficult, particularly inside a pipe.

Another known system uses sticky tape to secure the ceramic bodies in place during the welding operation. While fairly simple, the adhesive often lets go when heated by the welding operation, and the blocks are not held solidly enough that the chamber between them and the workpieces can be pressurized or at least effectively flooded with the protective hindgas. When the adhesive is heated it can produce vapors that damage the weld.

OBJECTS OF THE INVENTION

It is therefore an object of the present invention to provide an improved hindgas-protective device for a seam being welded.

Another object is the provision of such an improved hindgas-protective device for a seam being welded which overcomes the above-given disadvantages, that is which is easy to install, which holds solidly in place during the welding operation, which has a long service life, and which can be removed easily after the seam is welded.

SUMMARY OF THE INVENTION

A protective device for welding a seam between a pair of workpieces has according to the invention a flexible metallic band extending along the seam, spaced from surfaces of the workpieces, and having longitudinal edges on which are carried respective elastomeric heat-resistant strips extending the full length of the band and engaging the surfaces of the workpieces. A flexible ceramic band is provided between the elastomeric strips on the metal band between same and the surfaces. The band has a face turned toward and spaced from the surfaces and forms with the surfaces at the seam a chamber extending along the seam.

Such a device can easily conform to the shape of the seam when, for instance, the workpieces are pipes or otherwise curved. The metallic band constitutes good support for the ceramic band, normally formed of a woven ceramic or a row of rigid blocks. If due to extreme bending of the device a gap is opened up between adjacent ceramic blocks, the metallic band will block anything from passing the device.

The metallic band is of alloy steel and the elastomeric strips are of a silicone or fluoro-substituted rubber and are fixed to the edges of the metallic band. The ceramic band is fixed to the metal band and fits complementarily to the metal band and elastomeric strips. More specifically the ceramic band is of trapezoidal section having side surfaces diverging away from the workpiece surfaces. The elastomeric strips have edge surfaces complementary and parallel to the respective side surfaces of the ceramic band.

In accordance with the invention means is provided for feeding an inert gas to the chamber. To this end the ceramic band forms a longitudinal passage connected to the gas-feeder. A porous feed tube in the passage is connected to an inert-gas supply to flood the root of the seam with this gas and prevent the weld from oxidizing before the weldment material solidifies. This is particularly useful when dealing with alloyed steels where high-quality welds are required.

The metallic band according to the invention has ends and an outer surface provided at one of the ends with an anchor. The device further has a flexible tension element connected to the anchor so that the entire device can be pulled, when the welding is finished, out of the workpiece through a relatively narrow opening. The metallic band is provided at each of its ends with a fitting and a clip is engageable between the fittings for holding the ends of the metallic band and ends of the strips together with the device generally annular. Each fitting is an eye open laterally of the metallic band and the clip has a pair of legs engageable in the respective eyes. The strip ends are stepped and overlap when held together.

The strips in accordance with the invention each have a pair of longitudinal ridges engaging the respective surface of the workpieces and forming therewith a compartment. These compartments can be evacuated or to adhere the strips to the workpieces.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 1 is an axial section through a pair of pipes to be welded using the device of this invention;

FIG. 2 is a section taken along line II—II of FIG. 1;

FIG. 5 is a section taken along line V—V of FIG. 3;

FIG. 8 is a view like FIG. 7 of another device according to the invention.

SPECIFIC DESCRIPTION

Figure 3:
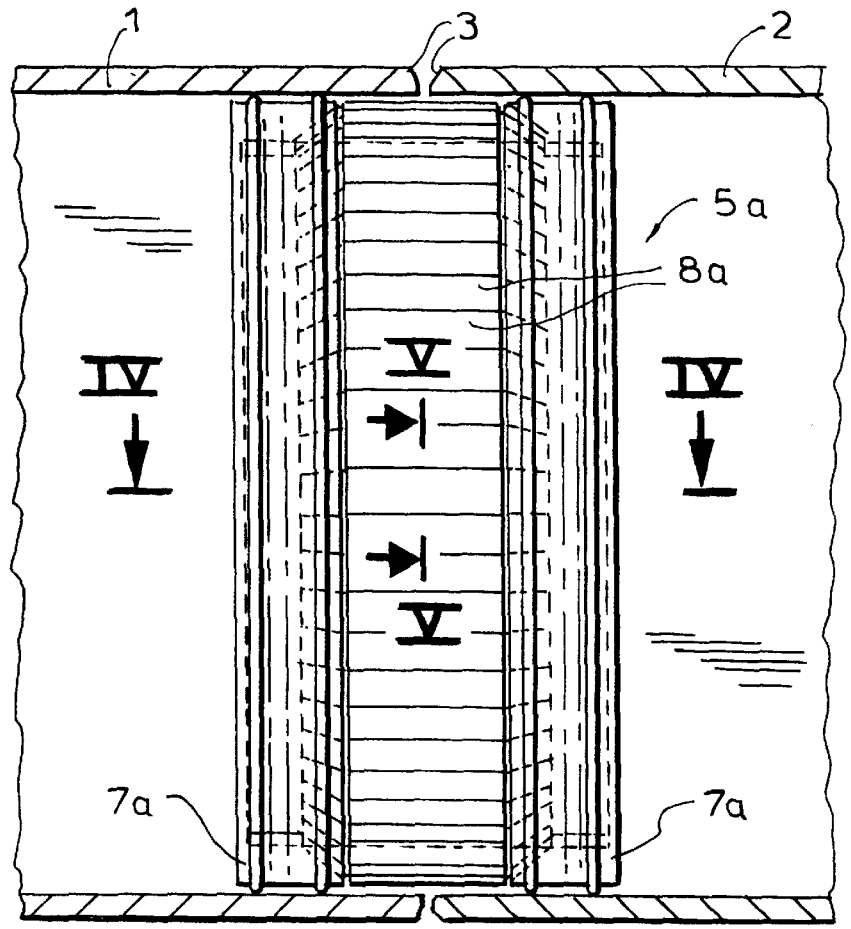
FIG. 3 is a view like FIG. 1 of another device according to the invention.

As seen in FIGS. 1 and 2 a pair of coaxial pipes 1 and 2 constituting workpieces have beveled ends 3 that axially confront each other and form a seam gap 4. A hindgas-protective device 5 is provided for flooding the root of this gap 4 with an inert gas, e.g. argon or a nitrogen mix. It basically comprises an elongated spring-steel band or strip 6 having longitudinal edges set in parallel silicone-rubber strips 7 and provided on its face turned toward the seam gap 4 with a band 8 of ceramic material, here of woven and flexible construction. The parts 6, 7, and 8 are formed for use into rings but are not annularly continuous. They form a chamber 9 at the root of the seam gap 4 to which a pressurized inert gas is fed via a connection 10 and a porous tube 11 that extends the full length of the strips 6 and 8, and that underlies the edge of the woven ceramic band 8.

Each of the seal strips 7 has a pair of full-length and axially spaced beads or ridges 12 that engage the inner face of the respective workpiece 1 or 2 and that form annular compartments 13 communicating through radial bores 14 with a longitudinal passage 15 formed in the respective strips 7. A pump 27 connected to the passages 15 allows the compartments 13 to be evacuated so that the strips 7 solidly grip the workpieces 1 and 2. The strips 7 have stepped ends 16 that overlap at 17 and the ends of the band 6 overlap so that the chamber 9 is also closed except at the gap 4.

To hold the device 5 in the illustrated annular shape each end of the band 6 is provided with an eye 18 open axially. Legs 19 of a clip 20 are inserted through the juxtaposed eyes 18 to hold the ends of the bands 6 and 8 and strips 7 together. A fitting 22 connected to the clip 20 is also connected to a cable 21. This fitting 22 is further connected via a flexible element, here a chain 23, to an anchor at one of the ends of the band 6.

This device is operated by installing it inside the pipes 1 and 2 in the illustrated position with the clip 20 through the adjacent eyes 18. The compartments 13 are depressurized to lock it in place, and an inert gas is fed into the annular chamber 9 through the fitting 10. The welding can take place with any droplets that fall through the gap 4 landing on the ceramic layer 8 so that they do not damage the device 5.

Once the welding, normally a TIG or GTAW process, is completed, the feed of inert gas to the chamber 9 is stopped and the compartments 13 are returned to atmospheric pressure, so that the device 5 is not held tightly on the workpieces 1 and 2. Then the cable 21 is pulled to first withdraw the legs 19 of the clip 20 from the eyes 18 and therefore disconnect the ends of the band 6 from each other. Further pulling on the cable 21 will exert an axial traction at the anchor 21 to pull out the assembly, in straight condition if necessary to fit through a small exit hole.

Figure 4:
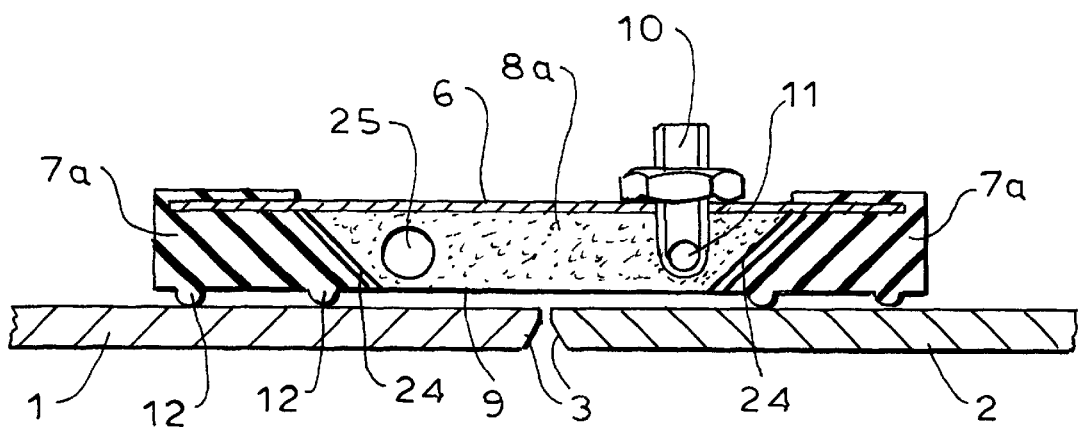
FIG. 4 is a section taken along line IV—IV of FIG. 1, some parts being not illustrated for clarity of view.

The device 5a of FIGS. 3 through 5 replaces the woven ceramic band 8 with a row of rigid blocks 8a. These blocks 8a are of isosceles-trapezoidal section, with angled end faces 24 that diverge outwardly away from the workpieces 1 and 2 and that fit with complementary angled side surfaces of the seal strips 7a. In addition the row of blocks 8a is formed with a pair of longitudinally throughgoing passages 25 in one of which is provided the porous inert-gas feed hose 11. Thus the inert gas will be able to enter the chamber 9 from the joints between adjacent blocks 8a, these joints being curved as shown at 26 to interfit and ensure that drops of weldment will not be able to pass between the blocks 8a and adhere to the steel band 6. This device 5a is held in place by conventional suction or magnetic clips not illustrated here.

Figure 6:
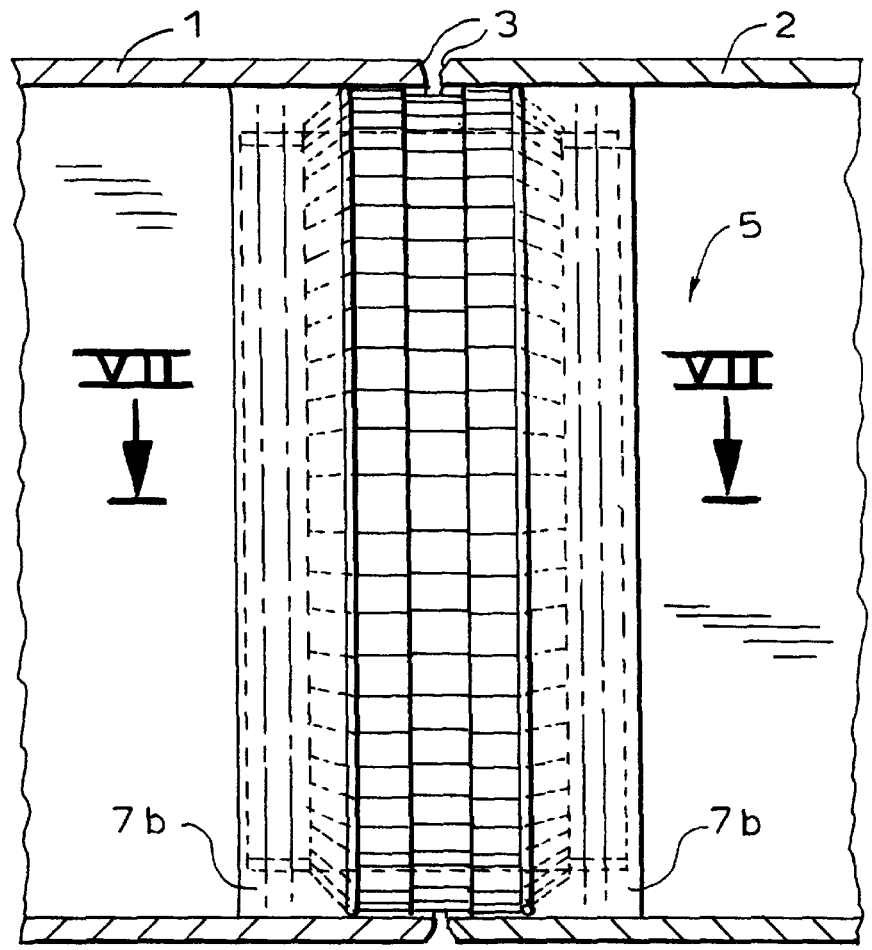
FIG. 6 is another view like FIG. 1 of another device in accordance with the invention.
Figure 7:
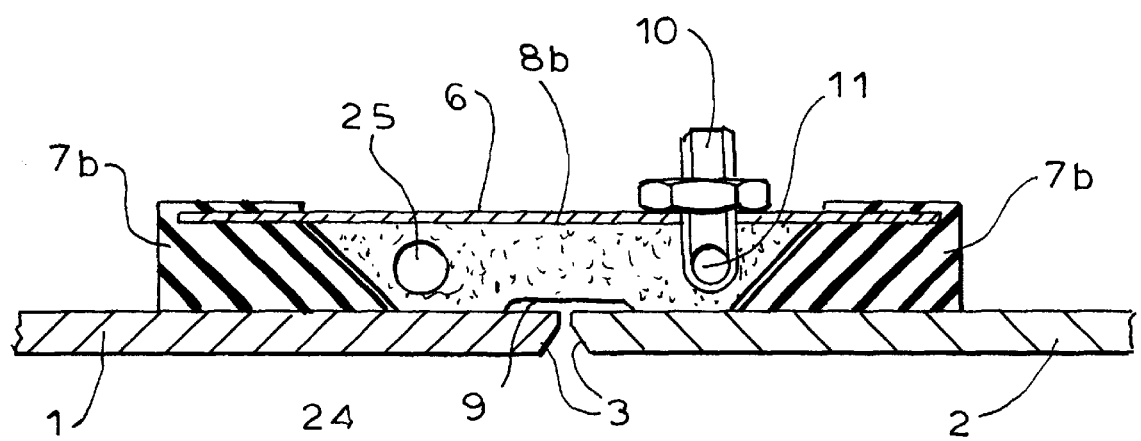
FIG. 7 is a section taken along line VII—VII of FIG. 6.

FIGS. 6 and 7 show an arrangement like that of FIGS. 3 through 5 but here the strips 7b and ceramic blocks 8b sit flatly directly on the inner surfaces of the workpieces 1 and 2. The blocks 8a are cut out to form the chamber 9.

In FIG. 8 the system is not intended for use in flooding the weld with inert gas, so that it is quite flat. To this end a very flat and flexible woven ceramic band 8c is riveted to a spring-steel strip 6c. This arrangement is therefore quite flexible and can be used even in tubes of relatively small diameter, or on workpieces of irregular shape.

I claim:

1. A protective device for welding a seam between a pair of workpieces, the device comprising:
   a flexible metallic band extending along the seam, spaced from surfaces of the workpieces, and having longitudinal edges;
   respective elastomeric heat-resistant strips extending the full length of the band at the respective edges and engaging the surfaces of the workpieces; and
   a flexible ceramic band between the elastomeric strips on the metal band between same and the surfaces, the band having a face turned toward and spaced from the surfaces and forming with the surfaces at the seam a chamber extending along the seam.

2. The protective device defined in claim 1 wherein the metallic band is of alloy steel.

3. The protective device defined in claim 1 wherein the elastomeric strips are fixed to the respective edges.

4. The protective device defined in claim 1 wherein the ceramic band is fixed to the metal band.

5. The protective device defined in claim 1 wherein each of the strips has a pair of longitudinal ridges engaging the respective surface of the workpieces and forming therewith a compartment, the device further comprising
   means for evacuating the compartments and adhering the strips to the workpieces.

6. The protective device defined in claim 1 wherein the ceramic band fits complementarily to the metal band and elastomeric strips.

7. The protective device defined in claim 6 wherein the ceramic band is of trapezoidal section having side surfaces diverging away from the workpiece surfaces, the elastomeric strips having edge surfaces complementary and parallel to the respective side surfaces of the ceramic band.

8. The protective device defined in claim 1, further comprising
   means for feeding an inert gas to the chamber.

9. The protective device defined in claim 8 wherein the ceramic band forms a longitudinal passage connected to the gas-feeding means.

10. The protective device defined in claim 8 wherein the gas-feeding means includes a porous feed tube in the passage.

11. The protective device defined in claim 1 wherein the metallic band has ends and an outer surface provided at one of the ends with an anchor, the device further comprising
    a flexible tension element connected to the anchor.

12. The protective device defined in claim 10 wherein the metallic band is provided at each of its ends with a fitting, the device further comprising
    means including a clip engageable between the fittings for holding the ends of the metallic band and ends of the strips together with the device generally annular.

13. The protective device defined in claim 11 wherein each fitting is an eye open laterally of the metallic band and the clip has a pair of legs engageable in the respective eyes.

14. The protective device defined in claim 11 wherein the strip ends are stepped and overlap when held together.

* * * * *